Nov. 16, 1937. R. R. CANDOR Re. 20,558

REFRIGERATING APPARATUS

Original Filed Nov. 29, 1930 2 Sheets-Sheet 1

INVENTOR
BY Robert R. Candor
Spencer Hardman and Fehr
ATTORNEYS

Nov. 16, 1937. R. R. CANDOR Re. 20,558

REFRIGERATING APPARATUS

Original Filed Nov. 29, 1930 2 Sheets-Sheet 2

INVENTOR
Robert R. Candor
BY
Spencer Hardman and Fehr
ATTORNEYS

Reissued Nov. 16, 1937

Re. 20,558

UNITED STATES PATENT OFFICE 20,558

REFRIGERATING APPARATUS

Robert R. Candor, Dayton, Ohio, assignor, by mesne assignments, to General Motors Corporation, a corporation of Delaware Original No. 1,899,013, dated February 28, 1933, Serial No. 499,040, November 29, 1930. Application for reissue February 28, 1935, Serial No. 8,773

14 Claims. (Cl. 62—141)

This invention relates to refrigerating apparatus and more particularly to drinking water coolers.

In the drinking water coolers in use at the present time, the water supplied from the bubbler or fountain is at a comparatively low temperature. It has been found that some persons dislike drinking water at such a comparatively low temperature while others have a preference for it.

An object of the invention is to provide an improved drinking water cooler having means controlled by the one desiring to drink for securing water from a bubbler, fountain or other dispensing device almost instantaneously at the particular temperature which he personally desires.

Further objects and advantages of the present invention will be apparent from the following description, reference being had to the accompanying drawings, wherein a preferred form of the present invention is clearly shown.

Figures 1, 2:
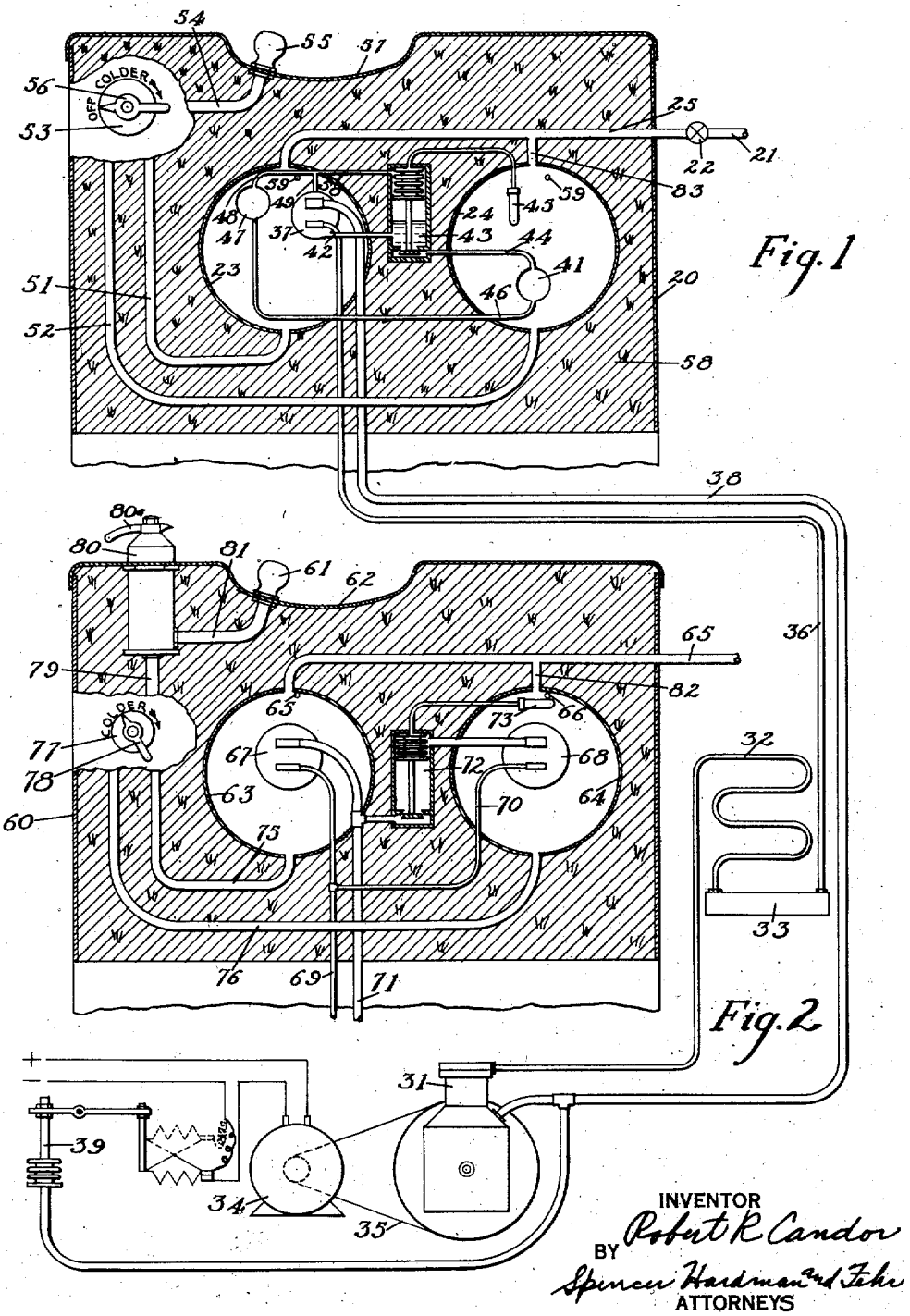
Fig. 1 is a sectional view of a drinking water cooler embodying one form of my invention.
Fig. 2 is a sectional view of a drinking water cooler embodying another form of my invention.

Referring to the drawings and more particularly to Fig. 1, there is shown a drinking water cooler cabinet 20 which is supplied with water suitable for drinking purposes from an outside source through the conduit 21 and through a pressure reducing valve 22 which automatically limits the pressure of the water in the cooler to provide the proper height of discharge at the bubbler hereinafter described regardless of the pressure in the source 21. A pair of water reservoirs or tanks 23 and 24 are positioned within the cabinet 20 and connected to the pressure reducing valve 22 by the conduit 25. These reservoirs are provided with suitable vents 59 for providing for the escape of trapped air when the reservoirs are being filled. The upper portion of the cabinet 20 is filled with suitable insulation 58 which surrounds the reservoirs 23 and 24 and connecting conduits.

In accordance with the present invention, means are provided for cooling the water in the reservoirs 23 and 24 to different temperatures. To this end a refrigerating system is positioned preferably in the lower part of the cabinet 20. In Fig. 1 for illustrative purposes there is shown diagrammatically a refrigerating system of the compressor-condenser-expander type including a compressor 31 for compressing the refrigerant, preferably sulphur dioxide, and for forwarding it to the condenser 32 where it is liquefied and collected in the receiver 33. A supply conduit 36 supplies liquid refrigerant to a float chamber 37 positioned within the reservoir 23 where the liquid refrigerant vaporizes because of the absorption of heat and is returned from the compressor through the return conduit 38. The actuating means for the compressor preferably comprises a motor 34 connected by pulley and belt means 35 to the compressor. A pressure responsive switch means 39 is preferably connected to the return conduit 38 for controlling the motor 34 to provide alternating operating and idle periods of the compressor according to the pressure and consequently the temperature of the float chamber 37. The water in the reservoir 34 is cooled by a cooling member 41 which is supplied with liquid refrigerant from the float chamber 37 through the conduit 42 past the valve 43 and through the conduit 44. The valve 43 is controlled by a thermostatic bulb 45 positioned in the water reservoir 24. The opening of the valve 43 allows liquid refrigerant to flow from the float chamber 37 through the conduit 42 and 44 to cooling member 41 and also allows gaseous refrigerant to escape from the cooling member through the conduits 44 and 50. The closing of the valve 43 prevents the flow of liquid refrigerant in the float chamber 37 to the cooling member 41 and also prevents the flow of gaseous refrigerant from the cooling member 41 back to the float chamber 37. Consequently gaseous refrigerant formed by the absorption of heat from the water in the reservoir 24 collects in the top of the cooling member 41 and forces liquid refrigerant out of the cooling member 41 through the conduit 46 connected to the bottom thereof. This conduit 46 conducts liquid refrigerant to a reservoir 47 preferably positioned above the level of liquid refrigerant within the float chamber 47. A conduit 48 is connected to the top of the reservoir 47 to conduct displaced gaseous refrigerant through a conduit 49 into the float chamber 37. By means of this system which includes the conduits 42, 44, 46, 48, 49 and 50 as well as the valve 43, the cooling member 41, the reservoir 47 and the thermostatic bulb 45, the temperature of the water within the reservoir 24 may be regulated.

The valve 43 is opened and closed at proper times so that only the proper amount of liquid refrigerant is kept within the cooling member 41 to keep the water in the reservoir at the temperature to which the thermostatic bulb 45 is set. According to the present invention, the thermostatic bulb 45 is set to cool the water in the reservoir 24 a lesser amount, that is to maintain a higher temperature than that of the water in the reservoir 23, the temperature of which is controlled by pressure responsive switch means 39.

Conduits 51 and 52 are connected to the bottom of each of the water reservoirs 23 and 24 and conduct the cooled water to a combined control and mixing valve 53 which both turns off and on the water as well as varies the ratio between the amount of water from each of the water reservoirs 23 and 24 through the conduit 54 to the bubbler or fountain 55. By properly manipulating the operating handle 56 of the mixing valve 53, any desired ratio of water from the reservoirs 23 and 24 may be obtained in order to obtain the desired temperature of water in the fountain or bubbler 55 while the valve 22 limits the pressure at the bubbler 55 to provide the proper height of discharge from the bubbler 55. The cabinet 20 is provided with a catch basin 57 to catch the water discharged from the fountain 55.

In Fig. 2 there is shown another embodiment of the invention which includes a drinking water cooler cabinet 60 provided with a fountain or bubbler 61 and a catch basin 62. Situated within the upper portion of the water cooler are a pair of water reservoirs 63 and 64 which are supplied with water suitable for drinking purposes through the conduit 65 which connects the reservoirs to a suitable source of supply. These reservoirs 63 and 64 are provided with suitable vents 65 and 66 for permitting the escape of air when the reservoir is being filled. The reservoirs 63 and 64 respectively are cooled by cooling units 67 and 68 which are supplied with liquid refrigerant through the conduit 69 and the conduit 70 from a refrigerating system, preferably similar to that previously described, which, as before, is preferably situated in the lower part of the cabinet of the drinking water cooler 60. The gaseous refrigerant is withdrawn from the cooling units 67 and 68 through the conduit 71. The water within the reservoir 64 is cooled to a lesser degree than the water within the reservoir 63 since the valve 72, which is controlled and operated by the thermostatic bulb 73 positioned within the reservoir 68, controls the escape of gaseous refrigerant. By this means the pressure and consequently the temperature of the cooling unit 68 is controlled to maintain the proper temperature of the water within the reservoir 64 according to the setting of the thermostatic bulb 73.

Conduits 75 and 76 conduct water from the bottom of the reservoirs 63 and 64 to a mixing valve 77 which is provided with an operating handle 78 for controlling the ratio of the amount of water which is taken from each of the conduits 75 and 76. The mixing valve in this embodiment is connected by a conduit 79 to a combined automatic pressure and flow control valve 80 which controls the flow and pressure of water through a conduit 81 to the bubbler or fountain 61 and automatically limits the pressure, so that the water is discharged at the proper height from the bubbler 61 regardless of the amount of turn of the handle **80*a* and regardless of the pressure in pipe 65. By moving the operating handle 78 of the mixing valve 77** to the proper position, any desired temperature of water within reasonable limits may be obtained.

The arrangement is, therefore, such that the refrigerant flows in parallel through the evaporators 67 and 68. The relatively cold evaporator 67 inside the cold storage tank or reservoir 63 cools the liquid in the tank where it remains in readiness to supplement or substitute the refrigerating action imposed upon a fluid by the evaporator 68.

In either modification the warmer water reservoir may be an uncooled by-pass around the colder water reservoir so that the branch 83 can discharge directly into the pipe 52 without passing through reservoir 24 and the pipe 82 can discharge directly into pipe 76 without passing through reservoir 64.

Figure 3:
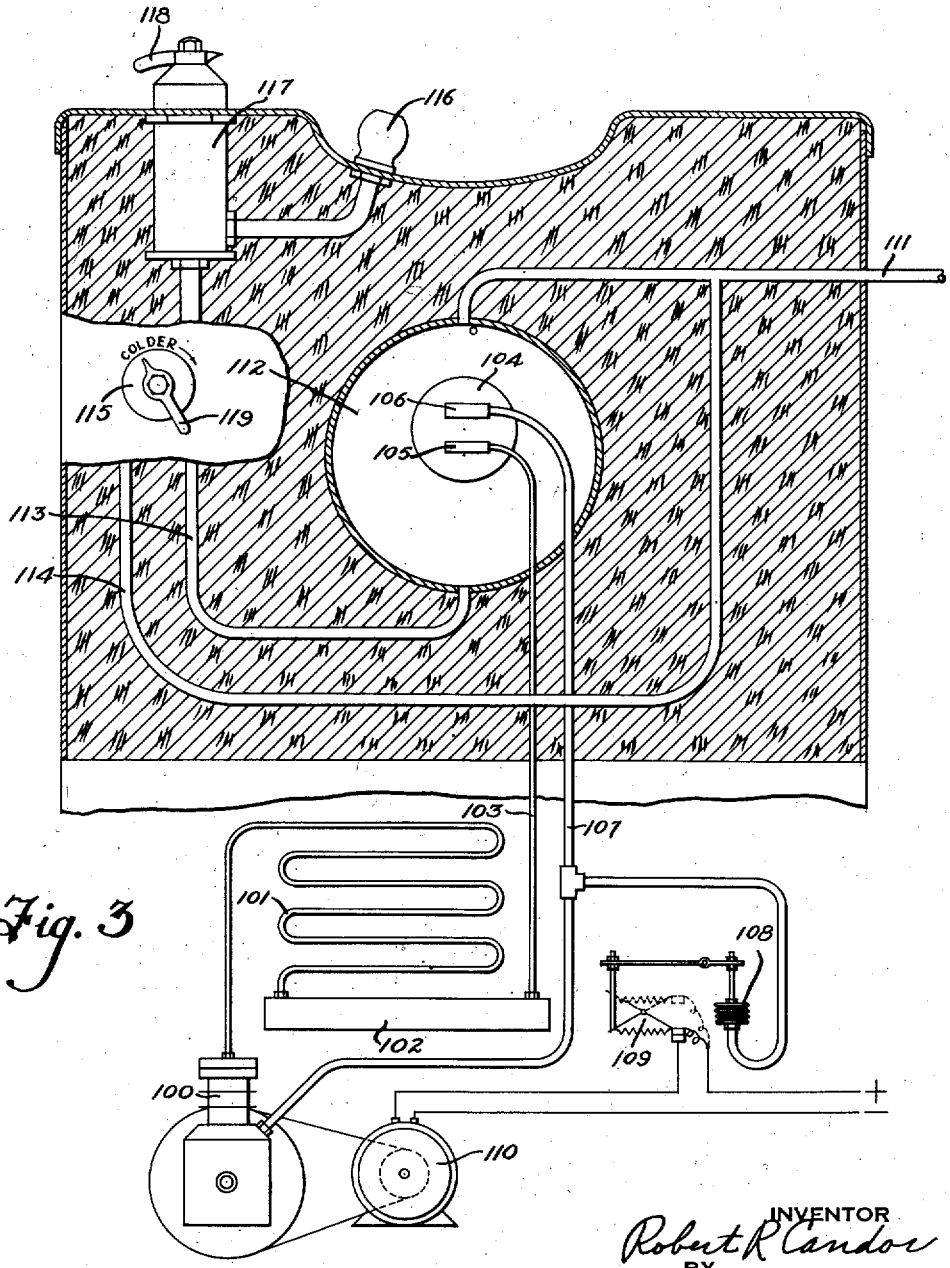
Fig. 3 is a sectional view of a drinking water cooler embodying a further form of my invention.

Thus in Fig. 3 there is shown a water cooler in which the warmer water reservoir is not used or has been omitted, and in which the uncooled by-pass is provided around the cooled water reservoir. In this modification a compressor 100 forwards compressed refrigerant to a condenser 101 which in turn discharges into the liquid refrigerant reservoir 102. Liquid refrigerant then flows through the line 103 to the refrigerant evaporator 104 through the fixture 105. The evaporated refrigerant returns through the fixture 106 into the line 107 and back to the compressor 100. The temperature of the liquid refrigerant in the evaporator 104 is maintained at a substantially constant temperature by any suitable means, such as an expansible bellows 108 connected to the line 107 and controlling a snap switch 109, which in turn controls the starting and stopping of the motor 110 which drives the compressor 100. The evaporator 104 may be of the type now recognized in the art, an example of which is more fully disclosed in the patent to R. G. Osborn 1,556,708, patented October 13, 1925. The water cooler is provided with a source of drinking water 111, which may be connected to the city water supply or any other source of drinking water, preferably under pressure. A portion of the water coming from the supply 111 is introduced into the drinking water reservoir 112 and is discharged therefrom through the conduit 113. Means are provided for by-passing another portion of the water coming from the water supply 111, and to this end a conduit 114 is connected to the pipe 111 and joins the conduit 113 through the medium of a mixing valve 115, which mixing valve may be adjusted to vary the ratio of water flowing through the conduits 113 and 114. From the mixing valve 115, the water is discharged through the bubbler 116 through the medium of a combined float control and pressure control valve 117 which maintains a constant discharge pressure at the bubbler 116, and which can shut off and turn on the flow of liquid to the bubbler 116 by the operation of a handle 119. Devices of the character disclosed at 115 and 117 are now well-known in the art, and need not be described further. By the embodiment shown in this figure, a person may vary the temperature of the water discharged at the discharge device or bubbler 116 by adjusting the handle 119 of the device 115 to vary the ratio of the flow through the conduits 113 and 114, and thereafter manipulating the handle 118 to start the flow of water through the device 116.

By means of the invention disclosed herein it is possible for a person to obtain almost instantaneously drinking water of the desired temperature without waiting for a large quantity of water to be cooled or tempered for his own particular purpose. As soon as a small quantity of water has been discharged, so that the standing water in the conduits 113 and 114 has been discharged it is possible for such a person to obtain the desired drinking water temperature within the range of the temperature within the reservoir 112 and in the water supply 111.

While the form of embodiment of the invention as herein disclosed constitutes a preferred form, it is to be understood that other forms might be adopted, all coming within the scope of the claims which follow.

What is claimed is as follows:

1. In a drinking water cooler, the combination of a unitary drinking water discharge device and means for securing the discharge of water at various desired temperatures from the discharge device including a source of drinking water, means of a substantially constant temperature for cooling a portion of the water, means for mixing in variable ratios the cooled portion with another portion of water from said source of drinking water and discharging said mixed portions from the discharge device.

2. In a drinking water cooler, a source of drinking water, a reservoir receiving drinking water from said source, means of a substantially constant temperature for cooling the water within the reservoir, a drinking water discharge device, means for by-passing a portion of water from said source around said reservoir without subjecting it to the cooling action of said reservoir, and means for mixing and discharging in one stream in variable ratios the water from the reservoir and the by-passed portion to secure a desired temperature.

3. In a drinking water cooler, a cabinet, a drinking water discharge device connected to the cabinet, and means for securing the discharge of water at any desired temperature from the discharge device including a source of drinking water, means within the cabinet for automatically cooling a portion of the water supplied, controllable means for mixing in variable ratios the cooled portion and another portion of the water from said source, and means for conducting the mixed water to the discharge device.

4. In a drinking water cooler, a bubbler, means for connecting said bubbler to a source of drinking water under pressure, means for cooling at least a portion of the water, means for mixing the cooled water with warmer water from said source and discharging the mixture from the bubbler in one stream, and unitary manual control means for varying the ratio of the cooled water and the warmer water.

5. In a drinking water cooler, a pair of water reservoirs connected to a source of water supply, means for cooling the water in one of the reservoirs to one temperature, means for maintaining the water in the second reservoir at a second temperature, and means for mixing and discharging water in one stream from said reservoirs.

6. In a drinking water cooler, a pair of water reservoirs connected to a source of water supply, means for cooling the water in one of the reservoirs to one temperature, means for maintaining the water in the second reservoir at a second temperature, means for mixing and discharging water from said reservoirs in one stream and means for varying the ratio of water discharged from said reservoirs.

7. In a drinking water cooler, a pair of water reservoirs having means for connecting to a source of water supply, means for cooling the water in one of the reservoirs to one temperature, means for maintaining the water in the second reservoir at a second temperature, means for mixing and discharging water from said reservoirs in one stream and means for varying the temperature of the discharged water.

8. A drinking water cooler including a water discharge device, a refrigerating system, a source of water, means for thermally contacting water from said source with said system to cool the water, and means independent of said refrigerating system for varying the temperature of the water discharged from said device.

9. A drinking water cooler, including a water discharge device, a refrigerating system, an automatic temperature control for said system, a source of water, means for thermally contacting water from said source with said system to cool the water, and means for varying the temperature of the water discharged from said device independently of the control of the refrigerating system.

10. In a drinking water cooler, a bubbler, means for connecting to a source of drinking water, means for cooling at least a portion of the water, means for mixing the cooled water with warmer water and discharging the mixture from the bubbler in one stream, control means for varying the ratio of the cooled water and the warmer water discharged from said bubbler, means for controlling the discharge of water from said bubbler and means for automatically limiting the pressure of the water discharged at said bubbler regardless of the pressure of the source of the drinking water.

11. In a refrigerating system, a cold storage tank containing a cooled liquid, a refrigerating evaporator positioned inside the tank, a refrigerating evaporator positioned outside said tank and cooling a medium, the two evaporators being connected in parallel, means for circulating a refrigerant through either one of said evaporators, and means for conveying cooled liquid to aid in cooling said medium.

12. In combination, a relatively warm refrigerant evaporator, a relatively cold refrigerant evaporator, means for circulating refrigerant through said evaporators, means for cooling a medium with said relatively warm refrigerant evaporator, a tank containing cooled liquid, and means for circulating said cooled liquid in thermal contact with said medium.

13. In a refrigerating system, a cold storage tank, a refrigerating evaporator positioned inside the tank, a refrigerating evaporator positioned outside said tank, the two evaporators being connected in parallel, means for circulating a refrigerant alternatively through either one of said evaporators, and means for utilizing cooled liquid from said tank outside said tank in thermal exchange with fluid cooled by said coil positioned outside said tank.

14. In combination, means for circulating a flowing fluid from a source to a place of use, a plurality of evaporators in parallel refrigerant flow relationship, means for automatically circulating refrigerant at different temperatures and at different times in said evaporators, one of said evaporators being in thermal contact with said flowing fluid, a tank, the other of said evaporators being in thermal exchange relationship with said tank, and means for flowing liquid from said tank into contact with said flowing fluid to vary the temperature of said fluid.

ROBERT R. CANDOR.